United States Patent
Huang et al.

(10) Patent No.: US 12,323,792 B2
(45) Date of Patent: Jun. 3, 2025

(54) VIRTUAL KEY SHARING SYSTEM AND METHOD

(71) Applicant: BYD COMPANY LIMITED, Guangdong (CN)

(72) Inventors: Kerui Huang, Shenzhen (CN); Chengpiao Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 131 days.

(21) Appl. No.: 18/212,670

(22) Filed: Jun. 21, 2023

(65) Prior Publication Data

US 2023/0336982 A1  Oct. 19, 2023

Related U.S. Application Data

(63) Continuation of application No. PCT/CN2021/141263, filed on Dec. 24, 2021.

(30) Foreign Application Priority Data

Dec. 30, 2020 (CN) .......................... 202011609923.9

(51) Int. Cl.
*H04W 12/04* (2021.01)
*H04W 12/0471* (2021.01)
(Continued)

(52) U.S. Cl.
CPC ..... *H04W 12/0471* (2021.01); *H04W 12/069* (2021.01); *H04W 12/47* (2021.01)

(58) Field of Classification Search
CPC ............. B60R 25/24; B60R 2325/103; H04W 12/084; H04W 12/069; H04W 4/80; H04W 12/47; H04W 12/0471
See application file for complete search history.

(56) References Cited

U.S. PATENT DOCUMENTS

| | | | |
|---|---|---|---|
| 2012/0161967 A1* | 6/2012 | Stern | G06Q 10/087 340/572.1 |
| 2015/0147974 A1* | 5/2015 | Tucker | B60R 25/01 455/41.2 |

(Continued)

FOREIGN PATENT DOCUMENTS

| | | | |
|---|---|---|---|
| CN | 104424679 A | | 3/2015 |
| CN | 106394486 A | * | 2/2017 |

(Continued)

OTHER PUBLICATIONS

International Search Report and Written Opinion for Application No. PCT/CN2021/141263, mailed on Feb. 23, 2022, 9 pages.

(Continued)

*Primary Examiner* — Harunur Rashid

(57) ABSTRACT

The present disclosure provides a virtual key sharing system, including: a first terminal, configured to: acquire share permission information inputted by a user, generate a touch button according to the share permission information, enable a near field communication (NFC) module in response to acquiring a touch signal indicating that the user touches the touch button, and determine whether a second terminal exists by polling through an NFC signal of the NFC module, and in response to determining that the second terminal exists, transmit an information feedback instruction to the second terminal; the second terminal, configured to transmit information for authorization to the first terminal in response to receiving an information feedback instruction; and a vehicle manufacturer server, configured to receive the information for authorization transmitted by the first terminal, to generate an authorization credential according to the information for authorization.

17 Claims, 1 Drawing Sheet

(51) Int. Cl.
*H04W 12/069* (2021.01)
*H04W 12/47* (2021.01)

(56) References Cited

U.S. PATENT DOCUMENTS

| | | | |
|---|---|---|---|
| 2016/0019738 A1* | 1/2016 | Kim | G07C 9/00182 |
| | | | 340/5.22 |
| 2016/0318481 A1* | 11/2016 | Penilla | H04W 4/44 |
| 2021/0076208 A1 | 3/2021 | Hassani et al. | |

FOREIGN PATENT DOCUMENTS

| | | | | |
|---|---|---|---|---|
| CN | 108569250 A | | 9/2018 | |
| CN | 109446767 A | | 3/2019 | |
| CN | 109637034 A | * | 4/2019 | ......... G06Q 30/0645 |
| CN | 109936833 A | | 6/2019 | |
| CN | 110136306 A | | 8/2019 | |
| JP | 2016-204912 A | | 12/2016 | |
| JP | 2018-092323 A | | 6/2018 | |
| JP | 2019-105881 A | | 6/2019 | |
| JP | 6571847 B1 | | 9/2019 | |
| KR | 10-2019-0105772 | * | 9/2019 | |
| WO | 2020/254521 A1 | | 12/2020 | |
| WO | WO-2021097446 A1 | * | 5/2021 | ......... G06F 16/9566 |

OTHER PUBLICATIONS

Whitepaper, "Digital Key—The Future of Vehicle Access", Car Connectivity Consortium, 2020, XP093000498, 20 pages.

\* cited by examiner

VIRTUAL KEY SHARING SYSTEM AND METHOD

CROSS-REFERENCE TO RELATED APPLICATIONS

This application is a Continuation Application of International Patent Application No. PCT/CN2021/141263, filed on Dec. 24, 2021, which is based on and claims priority to and benefits of Chinese Patent Application No. 202011609923.9, filed on Dec. 30, 2020. The entire content of all of the above-referenced applications is incorporated herein by reference.

FIELD

The present disclosure relates to the field of intelligent keys, and more particularly, to a virtual key sharing system and method.

BACKGROUND

In the related art, the way of sharing a vehicle key through a network is used only when a vehicle owner and an authorized user are close to each other, and is relatively cumbersome and inconvenient for the specific use, and the vehicle owner and the authorized user both need to touch their phones for the next interaction.

SUMMARY

The present disclosure improves the convenience of intelligent virtual key transmission, and carries the near field communication (NFC) technology to achieve a more stable, safer, and more effective near field transmission mode.

In order to achieve the above object, the present disclosure provides a virtual key sharing system, which solves the problem of cumbersome and inconvenient use of intelligent virtual keys.

According to an embodiment of the present disclosure, a virtual key sharing system includes: a first terminal is configured to: acquire share permission information inputted by a user, generate a touch button according to the share permission information, enable a near field communication (NFC) module in response to acquiring a touch signal indicating that the user touches the touch button, and determine whether a second terminal exists by polling through an NFC signal of the NFC module, and transmit an information feedback instruction to the second terminal in response to determining that the second terminal exists. The second terminal is configured to transmit information for authorization to the first terminal in response to receiving the information feedback instruction. A vehicle manufacturer server is configured to receive the information for authorization transmitted by the first terminal, to generate an authorization credential according to the information for authorization.

According to an embodiment of the present disclosure, a check terminal is configured to receive an effective NFC communication range transmitted by the first terminal.

The vehicle manufacturer server transmits the authorization credential to the second terminal.

The check terminal acquires check information and the authorization credential and transmits the check information and the authorization credential to a mobile phone manufacturer server. The mobile phone manufacturer server transmits the check information and the authorization credential to the vehicle manufacturer server. The vehicle manufacturer server determines whether the second terminal is authorized according to the check information and the authorization credential.

According to an embodiment of the present disclosure, when the second terminal is authorized, a share permission instruction is generated and transmitted to the second terminal. The second terminal executes the share permission instruction to control a vehicle corresponding to the first terminal.

According to an embodiment of the present disclosure, the vehicle manufacturer server generates share success information and transmits the share success information to the first terminal. The first terminal outputs and displays the share success information.

According to an embodiment of the present disclosure, in response to determining that the second terminal is unauthorized, share failure information is generated, and the share failure information is transmitted to the first terminal. The first terminal outputs and displays the share failure information.

According to an embodiment of the present disclosure, the share permission information includes: a sharing duration and an enabled vehicle status. The enabled vehicle status includes: unlocking a vehicle door, starting a vehicle, or opening a trunk.

According to an embodiment of the present disclosure, the first terminal determines, according to the NFC signal of the first NFC module, whether the second terminal succeeds in the polling within a polling time threshold.

According to an embodiment of the present disclosure, the information for authorization includes: token information generated by the vehicle manufacturer server and information about an authorized vehicle.

According to an embodiment of the present disclosure, the authorization credential includes a credential of personalized data.

A virtual key sharing method includes: acquiring, by a first terminal, share permission information inputted by a user, and generating a touch button according to the share permission information; in response to acquiring a touch signal indicating that the user touches the touch button, enabling, by the first terminal, a near field communication (NFC) module, and determine whether a second terminal exists by polling through an NFC signal of the NFC module; transmitting, by the first terminal, an information feedback instruction to the second terminal in response to determining that the second terminal exists; transmitting, by the second terminal, information for authorization to the first terminal in response to receiving the information feedback instruction; and transmitting, by the first terminal, the information for authorization to a vehicle manufacturer server, and generating, by the vehicle manufacturer server, an authorization credential according to the information for authorization.

According to an embodiment of the present disclosure, the vehicle manufacturer server transmits the authorization credential to the check terminal.

The first terminal transmits an effective NFC communication range to a check terminal. The check terminal acquires check information and transmits the check information and the authorization credential to a mobile phone manufacturer server. The mobile phone manufacturer server transmits the check information and the authorization credential to the vehicle manufacturer server. The vehicle manufacturer server determines whether the check terminal is authorized according to the check information and the authorization credential.

A non-transitory computer-readable storage medium stores a virtual key sharing program. The virtual key sharing program is executed by a processor, to cause the processor to implement the above virtual key sharing method.

The additional aspects and advantages of the present disclosure are to be provided in the following description, some of which will become apparent from the following description or may be learned from practice of the present disclosure.

BRIEF DESCRIPTION OF THE DRAWINGS

The foregoing and/or additional aspects and advantages of the present disclosure become apparent and comprehensible in the following description of embodiments made with reference to the accompanying drawings.

DETAILED DESCRIPTION

Figures 1, 2:
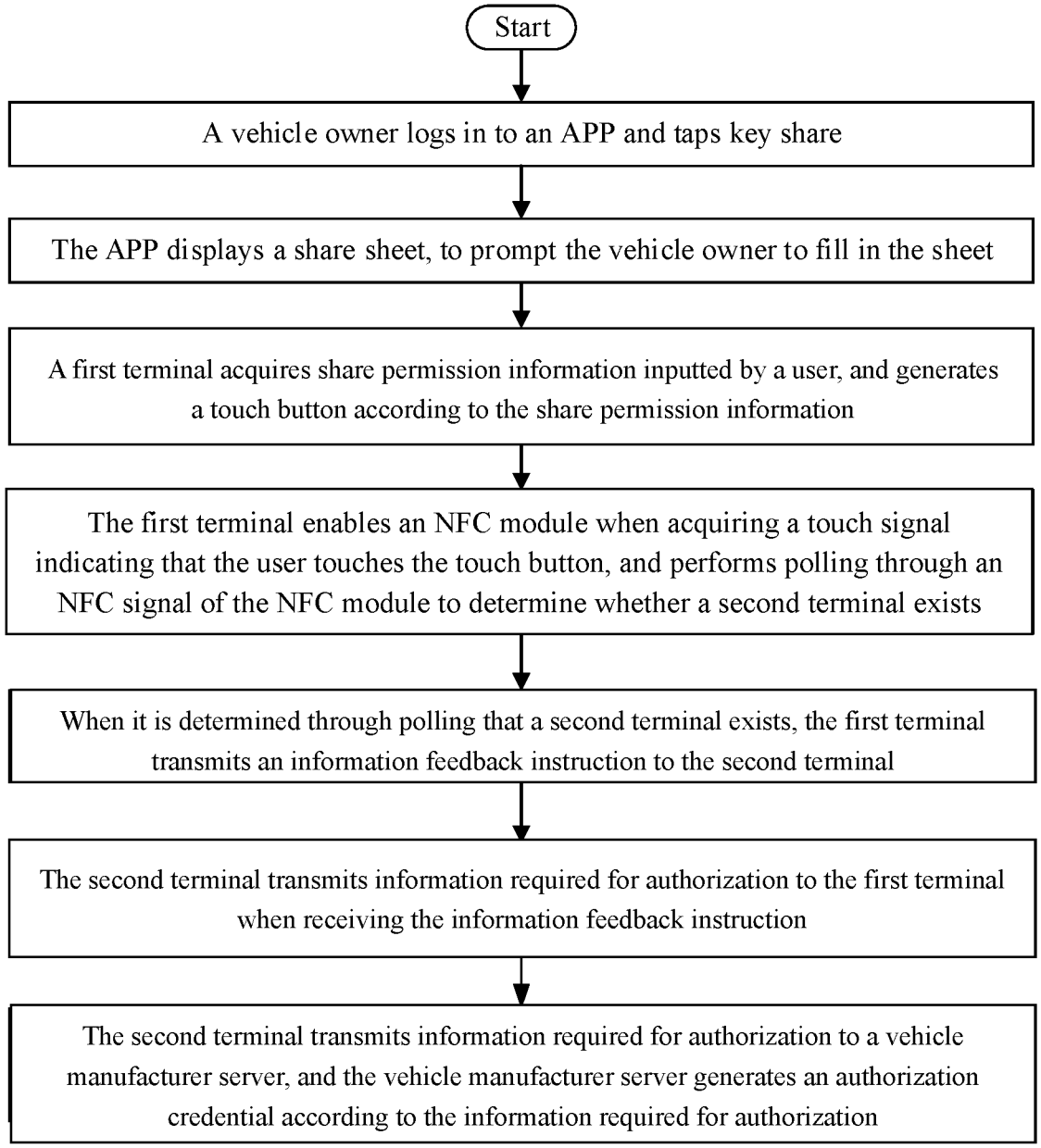
FIG. 1 is a system diagram of an embodiment of a virtual key sharing system according to the present disclosure.
FIG. 2 is a flowchart of an embodiment of a virtual key sharing system according to the present disclosure.

Embodiments of the present disclosure are described in detail below, and some of the embodiments are shown in the accompanying drawings, where the same or similar elements or elements having the same or similar functions are represented by the same or similar reference numerals throughout the description. Some of the embodiments are described below with reference to the accompanying drawings, and are merely to explain the present disclosure and do not construe as a limitation on the present disclosure.

In order to make the technical problems to be solved by the present disclosure, technical solutions, and beneficial effects more comprehensible, the present disclosure is further described in detail with reference to the accompanying drawings and embodiments. It should be understood that the specific embodiments described herein are only used to explain the present disclosure and are not used to limit the present disclosure.

As shown in FIG. 1, a first terminal is configured to: acquire share permission information inputted by a user, generate a touch button according to the share permission information, enable a first near field communication (NFC) module when acquiring a touch signal indicating that the user touches the touch button, and perform polling through an NFC signal of the first NFC module to determine whether a second terminal exists. The first terminal corresponds to a vehicle that may be shared with or loaned to a user corresponding to the second terminal after authorization. The second terminal is configured to transmit information required for authorization to the first terminal when receiving an information feedback instruction. A vehicle manufacturer server is configured to receive the information required for authorization transmitted by the first terminal, so as to generate an authorization credential according to the information required for authorization.

In an embodiment, the difference between required conditions is as follows. The manner of sharing a key through the network requires both the vehicle owner and the authorized user to download the same application (APP), and the manner of sharing a key by NFC requires mobile phones of both the vehicle owner and the authorized user to have the NFC function. Currently, the manner supports cross-platform sharing of Android phones. The difference between implementation logic is as follows.

The manner of sharing the key through the network is issuing the vehicle control authority to an authorized account through the server transfer. The manner of sharing the key is transmitting information between mobile phone devices through NFC and connecting multiple mobile phone manufacturer servers through vehicle manufacturer servers to realize message exchange and transmit registration information to a vehicle, so as to ensure the security of sharing the key from both the mobile phone and the vehicle.

The vehicle owner logs in to a vehicle enterprise APP and taps key share. The APP may detect whether the NFC of the mobile phone has been enabled. If the NFC of the mobile phone has been enabled, the APP will prompt the user to set the right to share the key, a period of validity, and the like. The user taps "Start Share" after the setting, and the APP displays an animation prompt of key share. The vehicle owner may follow the animation prompt on the APP to place the back of the mobile phone close to the back of the mobile phone of the authorized user with the NFC being enabled, and wait. The vehicle enterprise APP requests the certificate from the vehicle manufacturer server, and sends the certificate to the mobile phone of the authorized user by the NFC after receiving the response. The certificate is provided by the vehicle manufacturer server and transferred to the mobile phone by the mobile phone manufacturer server of the vehicle owner. In this process, the NFC technology can effectively prevent information from being stolen and ensure the data security. After receiving the certificate, the mobile phone of the authorized user sends the certificate to the mobile phone manufacturer server, the mobile phone manufacturer server then forwards the certificate (a digital file formed by signing some basic information and the public key of the applicant with the CA root certificate after the certificate authority verifies the identity of the certificate applicant) to the vehicle manufacturer server for verification. This process authenticates both the vehicle owner device and the authorized device. If the verification succeeds, the vehicle manufacturer server returns a response to the mobile phone manufacturer server, the response is forwarded to the authorized device by the mobile phone manufacturer server, and the authorized device returns and transmits encrypted information such as the SEID (security environment identifier) of the mobile phone and the mobile phone model to the vehicle owner device. The vehicle owner APP uploads the received information and to-be-shared vehicle information to the vehicle manufacturer server, acquires the token generated by the vehicle manufacturer server (the token generated by the server is used as the certificate for identity authentication) and to-be-authorized vehicle information, and sends the acquired information to the authorized device through the NFC as the certificate for acquiring the personalized data of the vehicle key. The mobile phone of the authorized user uploads the data to the mobile phone manufacturer server, and the mobile phone manufacturer server forwards the data to the vehicle manufacturer server. The vehicle manufacturer server performs authentication after receiving the data, and after the authentication succeeds, personalized data is generated and returned to the mobile phone manufacturer server, and the mobile phone manufacturer server sends the data to the mobile phone of the authorized user.

The mobile phone of the authorized user stores the personalized data, and returns a notification to the mobile phone manufacturer server to inquire about the key registration result. The mobile phone manufacturer server forwards the notification to the vehicle manufacturer server, the vehicle manufacturer server generates and sends vehicle registration data to the vehicle side, and the vehicle side stores the registration data and returns the result to the vehicle manufacturer server. The vehicle manufacturer server synchronizes the vehicle registration result to the mobile phone manufacturer server of the authorized device, and the authorized device finds the result and displays the result in the APP.

In this embodiment, the devices communicate with each other through NFC, which further ensures the data security. The authorized device sends the information such as token to the mobile phone manufacturer server, and then sends the information to the vehicle manufacturer server through the mobile phone manufacturer server. In this process, the communication between the servers is also safe. The devices of the vehicle owner and the authorized user are both keys of the same vehicle, but the data of each key is unique. The authorized user may use the shared NFC key to use the vehicle, without opening the mobile phone network, and the vehicle with the low battery can still be used, which is more convenient and faster.

During the implementation, NFC positions of different mobile phones vary, and the animation displayed by the APP should be designed as universal as possible.

In an embodiment, a check terminal is configured to receive an effective NFC communication range transmitted by the first terminal.

The vehicle manufacturer server transmits the authorization credential to the second terminal.

The check terminal acquires unique check information and the authorization credential and transmits the check information and the authorization credential to a mobile phone manufacturer server. The mobile phone manufacturer server transmits the check information and the authorization credential to the vehicle manufacturer server. The vehicle enterprise server determines whether the second terminal is authorized according to the check information and the authorization credential. When the second terminal is authorized, a share permission instruction is generated and transmitted to the second terminal. The second terminal executes the share permission instruction to control a vehicle corresponding to the first terminal. The vehicle manufacturer server generates share success information and transmits the share success information to the first terminal, and the first terminal outputs and displays the share success information for instant learning by a vehicle owner. When the check terminal is unauthorized, share failure information is generated, and the share failure information is transmitted to the first terminal. The first terminal outputs and displays the share failure information.

In an embodiment, the check terminal could be installed on or disposed on the second terminal.

In an embodiment, after the mobile phone of the authorized user receives the request of the mobile phone of the vehicle owner, the certificate is checked, and if the check succeeds, the information such as the SEID and the mobile phone model is returned to the mobile phone of the vehicle owner.

After receiving the response, the mobile phone of the vehicle owner sends authorization data (token, certificate, time stamp, and the like provided by the vehicle manufacturer) to the mobile phone of the authorized user. The mobile phone of the authorized user uploads the data to the mobile phone manufacturer server, and the mobile phone manufacturer server forwards the data to the vehicle manufacturer server. The vehicle manufacturer server performs authentication after receiving the data, and after the authentication succeeds, personalized data is generated and returned to the mobile phone manufacturer server, and the mobile phone manufacturer server sends the data to the mobile phone of the authorized user. The mobile phone of the authorized user stores the personalized data, and returns a notification to the mobile phone manufacturer server to inquire about the key registration result. The mobile phone manufacturer server forwards the notification to the vehicle manufacturer server, the vehicle manufacturer server generates and sends vehicle registration data to the vehicle side, and the vehicle side stores the registration data and returns the result to the vehicle manufacturer server. The vehicle manufacturer server synchronizes the vehicle registration result to the mobile phone manufacturer server of the authorized device, and the authorized device finds the result and displays the result in the APP. The registration result of the mobile phone of the authorized user may be sent to the vehicle enterprise APP of the vehicle owner through the vehicle manufacturer server for display and managed by the vehicle owner.

In an embodiment, the share permission information includes: a sharing duration and an enabled vehicle status. The enabled vehicle status includes: unlocking a vehicle door, starting a vehicle, and opening a trunk. It is determined according to the NFC signal of the NFC module whether the second terminal succeeds in the polling within a preset polling time threshold. The information required for authorization includes: token information generated by the vehicle manufacturer server and information about an authorized vehicle. The authorization credential is a credential of personalized data.

In an embodiment, when the sharing mobile phone confirms to start sharing the NFC virtual key, other human-computer interaction operations between the first terminal and the second terminal are not required, only a communication request between the server and the terminal is required, and finally the authorization result is informed of the second terminal and the first terminal. The first terminal, that is, the vehicle owner terminal has the right to control, can still control the share permission of the key after determining the sharing key. For example, the sharing time length is set to one day. The vehicle owner terminal may manually adjust the time to half a day or several hours or even directly select stop if it has not been one day yet by now. The system automatically stops sharing after the set time is reached, without requiring manual control.

The second terminal does not need to store the data shared by the first terminal, because a new different intelligent key is generated during each NFC key sharing.

The foregoing descriptions are merely some embodiments of the present disclosure, but do not limit the present disclosure. Any modification, equivalent replacement, or improvement made within the spirit and principle of the present disclosure shall fall within the protection scope of the present disclosure.

Some of the embodiments of the present disclosure have been shown and described, a person of ordinary skill in the art may understand that various changes, modifications, replacements, and variations may be made to the embodiments without departing from the principles and spirit of the present disclosure, and the scope of the present disclosure is defined by the appended claims and their equivalents.

In the description of this specification, the description of the reference terms "an embodiment", "some embodiments", "an example", "a specific example", "some examples," and the like means that specific features, structures, materials, or characteristics described in combination with the embodiment(s) or example(s) are included in at least one embodiment or example of the present disclosure. In this specification, schematic descriptions of the foregoing terms are not necessarily directed at the same embodiment or example. Besides, the specific features, the structures, the materials, or the characteristics that are described may be combined in proper manners in any one or more embodiments or examples. In addition, a person skilled in the art may integrate or combine different embodiments or examples described in this specification and features of the different embodiments or examples as long as they do not contradict each other.

In addition, the terms "first" and "second" are merely for the purpose of description, and cannot be construed as indicating or implying relative importance or implicitly specifying the number of technical features indicated. Therefore, a feature restricted by "first" or "second" may explicitly indicate or implicitly include at least one of such features. In the descriptions of the present disclosure, unless explicitly specified, "multiple" means at least two, for example, two or three.

Any process or method description described in the flowchart or in other manners herein can be understood as representing a module, fragment or part of code including one or more executable instructions for implementing customized logic functions or steps of the process, and the scope of preferred embodiments of the present disclosure includes additional implementations in which functions may be performed out of the order shown or discussed, for example, in a substantially simultaneous manner or in reverse order according to the functions involved, which should be understood by those skilled in the art to which embodiments of the present disclosure belong.

The logic and/or steps shown in the flowchart or described in other manners herein, for example, can be regarded as a sequence list of executable instructions for implementing logical functions, which can be implemented in any computer-readable medium for use by or in combination with an instruction execution system, apparatus, or device (such as a computer-based system, a system including a processor, or other systems that can fetch and execute instructions from an instruction execution system, apparatus, or device). In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer-readable storage medium include: an electrical connection portion (electronic device) with one or more wires, a portable computer case (magnetic device), a random access memory (RAM), a read-only memory (ROM), an erasable and editable read-only memory (EPROM or flash memory), an optical fiber device, and a portable compact disk read only memory (CDROM). In addition, the computer-readable medium may even be paper or other suitable medium on which the program can be printed, because the program can be obtained electronically, for example, by optically scanning the paper or other medium, then editing, interpreting, or processing in other suitable manners if necessary, and then stored in a computer memory.

It should be understood that parts of the present disclosure can be implemented by using hardware, software, firmware, or a combination thereof. In the foregoing implementations, multiple steps or methods may be implemented by using software or firmware stored in a memory and executed by a proper instruction execution system. For example, if implementation by hardware is the same as that in another embodiment, the implementation may be performed by any one or a combination of the following technologies known in the art: a discrete logic circuit with a logic gate for implementing a logical function on a data signal, an application-specific integrated circuit with an appropriate combinational logic gate, a programmable gate array (PGA), a field programmable gate array (FPGA), and the like.

A person of ordinary skill in the art may understand that all or some of the steps of the methods in the foregoing embodiments may be implemented by a program instructing relevant hardware. The program may be stored in a computer-readable storage medium, such as a non-transitory computer-readable storage medium. When the program is executed, one or a combination of the steps of the method embodiments is performed.

In addition, each functional unit in each embodiment of the present disclosure may be integrated into one processing module, or each unit may exist alone physically, or two or more units may be integrated into one module. The above integrated modules may be implemented in the form of hardware or a software function module. If implemented in the form of the software function module and sold or used as an independent product, the integrated module may also be stored in a computer-readable storage medium.

The storage medium mentioned above may be a read-only memory, a magnetic disk, an optical disk, or the like. Although the embodiments of the present disclosure have been shown and described above, it can be understood that, the foregoing embodiments are exemplary and should not be understood as a limitation on the present disclosure. A person of ordinary skill in the art can make changes, modifications, replacements, or variations to the foregoing embodiments within the scope of the present disclosure.

What is claimed is:

1. A system for virtual key sharing, comprising: a first terminal, a second terminal, a vehicle manufacturer server, a check terminal, and a mobile phone manufacturer server,
   wherein the first terminal is configured to:
     acquire share permission information inputted by a user,
     generate a touch button according to the share permission information,
     in response to acquiring a touch signal indicating that the user touches the touch button, enable a near field communication (NFC) module,
     determine whether the second terminal exists by polling through an NFC signal of the NFC module, and
     in response to determining that the second terminal exists, transmit an information feedback instruction to the second terminal;
   wherein the second terminal is configured to transmit information for authorization to the first terminal in response to receiving the information feedback instruction;
   wherein the vehicle manufacturer server is configured to receive the information for authorization transmitted by the first terminal, to generate an authorization credential according to the information for authorization, and to transmit the authorization credential to the second terminal;
   wherein the check terminal is configured to receive an effective NFC communication range transmitted by the first terminal, to acquire check information and the authorization credential, and to transmit the check information and the authorization credential to the mobile phone manufacturer server;

wherein the mobile phone manufacturer server is configured to transmit the check information and the authorization credential to the vehicle manufacturer server; and wherein the vehicle manufacturer server is further configured to determine whether the second terminal is authorized according to the check information and the authorization credential.

2. The system according to claim 1, wherein in response to determining that the second terminal is authorized, the vehicle manufacturer server is configured to generate a share permission instruction and transmit the share permission instruction to the second terminal; and the second terminal is configured to execute the share permission instruction to control a vehicle corresponding to the first terminal.

3. The system according to claim 2, wherein the vehicle manufacturer server is configured to generate share success information and transmit the share success information to the first terminal; and the first terminal is configured to output and display the share success information.

4. The system according to claim 1, wherein in response to determining that the second terminal is unauthorized, the vehicle manufacturer server is configured to generate share failure information and transmit the share failure information to the first terminal; and the first terminal is configured to output and display the share failure information.

5. The system according to claim 1, wherein the share permission information comprises a sharing duration and an enabled vehicle status; and the enabled vehicle status comprises: unlocking a vehicle door, starting a vehicle, or opening a trunk.

6. The system according to claim 1, wherein the first terminal is configured to determine, according to the NFC signal of the NFC module, whether the second terminal succeeds in the polling within a polling time threshold.

7. The system according to claim 1, wherein the information for authorization comprises token information generated by the vehicle manufacturer server and information about an authorized vehicle.

8. The system according to claim 1, wherein the authorization credential comprises a credential of personalized data.

9. A method for virtual key sharing, comprising:

acquiring, by a first terminal, share permission information inputted by a user, and generating a touch button according to the share permission information;

in response to acquiring a touch signal indicating that the user touches the touch button, enabling, by the first terminal, a near field communication (NFC) module, and determine whether a second terminal exists by polling through an NFC signal of the NFC module;

transmitting, by the first terminal, an information feedback instruction to the second terminal in response to determining that the second terminal exists;

transmitting, by the second terminal, information for authorization to the first terminal in response to receiving the information feedback instruction;

transmitting, by the first terminal, the information for authorization to a vehicle manufacturer server, and generating, by the vehicle manufacturer server, an authorization credential according to the information for authorization;

transmitting, by the first terminal, an effective NFC communication range to a check terminal;

transmitting, by the vehicle manufacturer server, the authorization credential to the second terminal;

acquiring, by the check terminal, check information and the authorization credential, and transmitting the check information and the authorization credential to a mobile phone manufacturer server;

transmitting, by the mobile phone manufacturer server, the check information and the authorization credential to the vehicle manufacturer server; and determining, by the vehicle manufacturer server, whether the second terminal is authorized according to the check information and the authorization credential.

10. The method according to claim 9, further comprising:

in response to determining that the second terminal is authorized, the vehicle manufacturer server generating a share permission instruction and transmitting the share permission instruction to the second terminal; and the second terminal executing the share permission instruction to control a vehicle corresponding to the first terminal.

11. The method according to claim 10, further comprising:

the vehicle manufacturer server generating share success information and transmitting the share success information to the first terminal; and the first terminal outputting and displaying the share success information.

12. The method according to claim 9, further comprising:

in response to determining that the second terminal is unauthorized, the vehicle manufacturer server generating share failure information and transmitting the share failure information to the first terminal; and the first terminal outputting and displaying the share failure information.

13. The method according to claim 9, wherein the share permission information comprises a sharing duration and an enabled vehicle status; and the enabled vehicle status comprises: unlocking a vehicle door, starting a vehicle, or opening a trunk.

14. The method according to claim 9, further comprising:

the first terminal determining, according to the NFC signal of the NFC module, whether the second terminal succeeds in the polling within a polling time threshold.

15. The method according to claim 9, wherein the information for authorization comprises token information generated by the vehicle manufacturer server and information about an authorized vehicle.

16. The method according to claim 9, wherein the authorization credential comprises a credential of personalized data.

17. A non-transitory computer-readable storage medium, storing a virtual key sharing program, wherein the virtual key sharing program is executed by a processor, to cause the processor to perform operations comprising:

acquiring, by a first terminal, share permission information inputted by a user, and generating a touch button according to the share permission information;

in response to acquiring a touch signal indicating that the user touches the touch button, enabling, by the first terminal, a near field communication (NFC) module, and determine whether a second terminal exists by polling through an NFC signal of the NFC module;

transmitting, by the first terminal, an information feedback instruction to the second terminal in response to determining that the second terminal exists;

transmitting, by the second terminal, information for authorization to the first terminal in response to receiving the information feedback instruction; and transmitting, by the first terminal, the information for authorization to a vehicle manufacturer server, and generating, by the vehicle manufacturer server, an authorization credential according to the information for authorization;

transmitting, by the first terminal, an effective NFC communication range to a check terminal;

transmitting, by the vehicle manufacturer server, the authorization credential to the second terminal;

acquiring, by the check terminal, check information and the authorization credential, and transmitting the check information and the authorization credential to a mobile phone manufacturer server;

transmitting, by the mobile phone manufacturer server, the check information and the authorization credential to the vehicle manufacturer server; and determining, by the vehicle manufacturer server, whether the second terminal is authorized according to the check information and the authorization credential.

* * * * *